United States Patent
Liu et al.

(10) Patent No.: US 11,840,647 B2
(45) Date of Patent: Dec. 12, 2023

(54) RECYCLABLE CONDUCTIVE ADHESIVE COMPOSITION FOR LED PACKAGING AND PREPARATION METHOD THEREOF, RECYCLING METHOD AND RECYCLED CONDUCTIVE SILVER POWDER

(71) Applicant: Blue Ocean & Black Stone Technology Co., Ltd. (Beijing), Beijing (CN)

(72) Inventors: Wanshuang Liu, Beijing (CN); Yi Wei, Beijing (CN); Hebin Luo, Beijing (CN)

(73) Assignee: Fujian Blue Ocean & Black Stone Technology Co., Ltd., Zhangzhou (CN)

( * ) Notice: Subject to any disclaimer, the term of this patent is extended or adjusted under 35 U.S.C. 154(b) by 404 days.

(21) Appl. No.: 17/011,883

(22) Filed: Sep. 3, 2020

(65) Prior Publication Data

US 2021/0087441 A1 Mar. 25, 2021

(30) Foreign Application Priority Data

Sep. 20, 2019 (CN) .......................... 201910897856.6

(51) Int. Cl.
| | |
|---|---|
| *C09J 163/04* | (2006.01) |
| *C09J 9/02* | (2006.01) |
| *C08K 3/08* | (2006.01) |
| *C08K 5/053* | (2006.01) |
| *C08K 5/06* | (2006.01) |
| *C08K 5/29* | (2006.01) |
| *C08K 5/3475* | (2006.01) |

(52) U.S. Cl.
CPC .............. *C09J 163/04* (2013.01); *C09J 9/02* (2013.01); *C08K 3/08* (2013.01); *C08K 5/053* (2013.01); *C08K 5/06* (2013.01); *C08K 5/29* (2013.01); *C08K 5/3475* (2013.01); *C08K 2003/0806* (2013.01)

(58) Field of Classification Search
None
See application file for complete search history.

(56) References Cited

U.S. PATENT DOCUMENTS

| 5,183,593 A * | 2/1993 | Durand .................. H05K 3/321 |
| | | 252/514 |
| 5,362,421 A * | 11/1994 | Kropp .................... C08G 59/68 |
| | | 428/355 R |
| 2017/0342301 A1* | 11/2017 | Huang ....................... C09J 9/02 |

FOREIGN PATENT DOCUMENTS

| CN | 102174306 A | | 9/2011 | |
| CN | 105754515 A | | 7/2016 | |
| CN | 108129638 A | * | 6/2018 | ........... C08G 59/504 |
| CN | 109777040 A | * | 5/2019 | |
| CN | 109777040 A | | 5/2019 | |
| CN | 110003443 A | | 7/2019 | |
| JP | 2016219600 A | | 12/2016 | |
| JP | 2017039846 A | | 2/2017 | |
| JP | 2017527641 A | | 9/2017 | |
| JP | 2018016722 A | | 2/2018 | |
| JP | 2019052237 A | | 4/2019 | |

OTHER PUBLICATIONS

CN-109777040-A, May 2019, Machine translation (Year: 2019).*
CN-108129638-A, Jun. 2018, Machine translation (Year: 2018).*
Japanese Patent Application No. 2020-133524, Notice of Reasons for Refusal, dated Jul. 29, 2021.
Chinese Patent Application No. 201910897856.6 First Office Action, dated Jun. 4, 2021.

* cited by examiner

Primary Examiner — Satya B Sastri
(74) Attorney, Agent, or Firm — Flener IP & Business Law; Zareefa B. Flener

(57) ABSTRACT

The present invention refers to a recyclable conductive adhesive composition for LED packaging and preparation method thereof, and its recycling method and the obtained recycled conductive silver powder, wherein the recyclable conductive adhesive composition for LED packaging comprises epoxy resin, epoxy resin diluent, curing agent containing imine bond, amine curing agent, curing accelerator, wetting dispersant, coupling agent, defoamer and conductive silver powder. The epoxy curing agent containing imine bond adopted in the present invention can introduce the dynamic imine chemical bond into the epoxy resin matrix of the conductive adhesive by curing reaction, and can endow the epoxy resin matrix with degradable function by its imine bond's feature of occurring dynamic exchange reaction with amine solvent under heating condition, therefore the conductive silver powder in the conductive adhesive can be recycled and reused.

15 Claims, No Drawings

RECYCLABLE CONDUCTIVE ADHESIVE COMPOSITION FOR LED PACKAGING AND PREPARATION METHOD THEREOF, RECYCLING METHOD AND RECYCLED CONDUCTIVE SILVER POWDER

CROSS-REFERENCE TO RELATED APPLICATIONS

The application claims priority of Chinese patent application CN201910897856.6, filed on Sep. 20, 2019, the entire contents of which are incorporated herein by reference.

TECHNICAL FIELD

The present invention refers to the technical field of microelectronic packaging materials, in particular to a recyclable conductive adhesive composition for LED packaging and preparation method thereof, and its recycling method and the obtained recycled conductive silver powder.

BACKGROUND

In the field of microelectronic packaging, traditional lead-tin alloy solder has been gradually prohibited from using in daily electronic products by developed countries such as Europe, the United States and Japan, due to its harm to human body and natural environment. In particular, EU promulgated regulations of Waste Electrical and Electronic Equipment Directive (WEEE) and Restriction of Hazardous Substances (RoHS) in June 2000 to explicitly limit the use of lead-containing solder. Nowadays, conductive adhesive is a new type of lead-free bonding technology to replace traditional metal welding, which has the characteristics of low operating temperature, lead-free environmental protection and simple process. The use of conductive adhesive bonding technology can not only meet the requirements of fine pitch interconnection, but also enable some temperature sensitive and low-cost circuit substrates to be applied, leading to reduce production costs.

The conductive adhesive is mainly composed of polymer resin matrix, conductive filler and functional additives, wherein silver powder filled epoxy resin is widely used in microelectronic packaging field, which is mainly due to the characteristics of excellent bonding properties, process properties and chemical corrosion resistance of epoxy resin, and the characteristics of low resistivity, high thermal conductivity and not easily oxidized in air of conductive silver filler. In order to obtain good property of electrical conductivity, the amount of conductive silver powder in the commercial silver filled epoxy resin conductive adhesive is usually about 80%, which accounts for a main part of the production cost of conductive adhesive. Due to the highly cross-linked chemical structure and the insoluble and non-fusible properties of conventional epoxy resin, once conductive adhesive is applied and solidified, it would be hard to recycle and reuse the conductive silver powder, which not only results in a waste of precious metal, but also destroys the natural environment because of the produced wastes. Exploring a recyclable conductive adhesive not only could recycle the expensive conductive silver powder, but also is beneficial to the recycling of useful electronic components from abandoned integrated circuits, which has important economic value and environmental significance, and is worth studying.

SUMMARY

In one aspect, the present invention provides a recyclable conductive adhesive composition for LED packaging.

In another aspect, the present invention provides a preparation method of the recyclable conductive adhesive composition for LED packaging.

In another aspect, the present invention provides a method for recycling the recyclable conductive adhesive composition for LED packaging.

In another aspect, the present invention provides a recycled conductive silver powder obtained by the above recycling method.

In one embodiment, the recyclable conductive adhesive composition for LED packaging comprises the following components by weight:

epoxy resin, 8% to 12%;
    epoxy resin diluent, 2% to 4%;
    curing agent containing imine bond, 3% to 6%;
    amine curing agent, 1% to 3%;
    curing accelerator, 0.1% to 0.3%;
    wetting dispersant, 0.1% to 0.3%;
    coupling agent, 0.1% to 0.3%;
    defoamer, 0.1% to 0.3%;
    conductive silver powder, 78% to 82%;
    wherein, the epoxy resin comprises at least two selected from electronic grade bisphenol A epoxy resin, electronic grade bisphenol F epoxy resin and naphthol bifunctional epoxy resin;
    the structural formula of the curing agent containing imine bond is

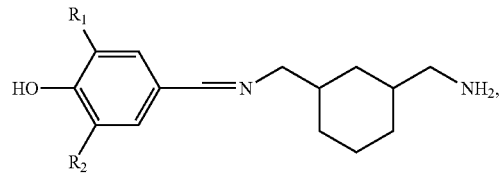

wherein $R_1$ is hydrogen or methoxy, $R_2$ is hydrogen or methoxy;
    the amine curing agent is lowviscous polyether amine curing agent and/or alicyclic amine curing agent;
    the average sheet diameter of the conductive silver powder is 5 μm to 20 μm.

In a preferred embodiment of the present invention, the epoxy resin diluent is one selected from ethylene glycol diglycidyl ether, butanediol diglycidyl ether and neopentyl glycol diglycidyl ether.

In a preferred embodiment of the present invention, the polyether amine curing agent is at least one selected from D-205, D-230 and D-400, and the alicyclic amine curing agent is at least one selected from isophorone diamine, 1,3-bis(aminomethyl)cyclohexane, 1-methyl-2,4-cyclohexanediamine and 4,4'-diaminodicyclohexylmethane.

In a preferred embodiment of the present invention, the curing accelerator is one selected from 2-ethyl-4-methylimidazole, 1-benzyl-2-methylimidazole, 1-cyanoethyl-2-ethyl-4-methylimidazole and DMP-30.

In a preferred embodiment of the present invention, the wetting dispersant is BYK-W980, BYK996, VATIX 2017 or VATIX 2018.

In a preferred embodiment of the present invention, the coupling agent is A-187, SCA-E87M, SCA-E87E, Silok 6634E or Silok 6634M.

In a preferred embodiment of the present invention, the defoamer is BYK-A530, BYK-320, VATIX 1030 or ACP-0001.

In a preferred embodiment of the present invention, the average sheet diameter of the conductive silver powder is 10 μm to 15 μm.

In another embodiment, the preparation method of the recyclable conductive adhesive composition for LED packaging, comprises the following steps:
(1) weighing each component by its weight percentage;
(2) putting epoxy resin, epoxy resin diluent, curing agent containing imine bond, amine curing agent, curing accelerator, wetting dispersant, coupling agent and defoamer into a blender to disperse to obtain a liquid mixture;
(3) adding conductive silver powder into the liquid mixture, dispersing in a blender, and then defoaming to obtain the recyclable conductive adhesive composition for LED packaging.

In a preferred embodiment of the present invention, in step (2), the dispersing lasts for 2 min to 4 min.

In a preferred embodiment of the present invention, in step (2) and/or step (3), the blender is in a mode of revolution and rotation synchronous agitation.

In a preferred embodiment of the present invention, in step (3), the dispersing lasts for 2 min to 4 min.

In a preferred embodiment of the present invention, in step (3), the defoaming is in vacuum and lasts for 30 min to 60 min.

In another embodiment, the method for recycling the recyclable conductive adhesive composition for LED packaging, comprises the following steps:
(1) putting a cured recyclable conductive adhesive composition for LED packaging into an amine solvent, heating it to make the epoxy resin component degraded to obtain a mixture;
(2) filtering and separating the mixture obtained in step (1) to obtain a filter cake;
(3) washing and drying the filter cake to obtain the recyclable conductive silver powder.

In a preferred embodiment of the present invention, in step (1), the amine solvent is 5 to 10 times the weight of the cured recyclable conductive adhesive composition for LED packaging.

In a preferred embodiment of the present invention, in step (1), the amine solvent includes at least one selected from butylamine, hexylamine, ethylenediamine, isophorone diamine, 1,3-bis(aminomethyl) cyclohexane, 1-methyl-2,4-cyclohexanediamine and 4,4'-diamino dicyclohexylmethane.

In a preferred embodiment of the present invention, in step (1), the heating is at the temperature of 50° C. to 80° C. and lasts for 2 h to 4 h.

In a preferred embodiment of the present invention, in step (3), washing the filter cake with absolute ethanol and drying it in vacuum.

Another technical solution of the present invention is to provide a recycled conductive silver powder obtained by the above method for recycling the recyclable conductive adhesive composition for LED packaging.

The beneficial effects of the present invention may include one or more of the follows: the epoxy curing agent containing imine bond adopted in the present invention can introduce the dynamic imine chemical bond into the epoxy resin matrix of the conductive adhesive by curing reaction, and can endow the epoxy resin matrix with degradable function by its imine bond's feature of occurring dynamic exchange reaction with amine solvent under heating condition, therefore the conductive silver powder in the conductive adhesive can be recycled and reused.

DETAILED DESCRIPTION OF THE EMBODIMENTS

The technical solutions of the present invention will be further illustrated and described in the following specific embodiments.

Example 1

The following components were accurately weighed and put into a blender using the revolution and rotation synchronous agitation mode to mix for 2 min: 7 parts of electronic grade bisphenol A epoxy resin (Huayi, Shanghai), 1.8 parts of naphthol bifunctional epoxy resin (DIC Corporation, Japan), 3.4 parts of diluent butanediol diglycidyl ether, 3 parts of curing agent containing imine bond, 2 parts of isophorone diamine, 0.2 parts of 2-ethyl-4-methylimidazole, 0.2 parts of wetting dispersant BYK996 (BYK, Germany), 0.2 parts of coupling agent A-187 (Momentive, USA), and 0.2 parts of defoamer VATIX 1030 (Vatix, Beijing). Then 82 parts of sheet silver powders with an average diameter of 12 μm (Northwest Institute for Non-ferrous Metal Research) were added to the above obtained liquid mixture and put into a blender using the revolution and rotation synchronous agitation mode to disperse for 2 min. The obtained mixture was defoamed for 40 min in vacuum to obtain the recyclable conductive adhesive for LED packaging. The structural formula of the curing agent containing imine bond is as follows:

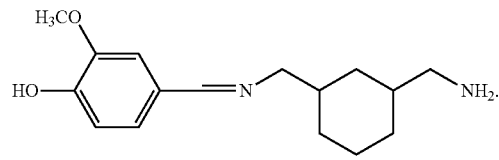 [SMILES: COc1cc(C=NCC2CCCC(CN)C2)ccc1O]

The curing condition of the recyclable conductive adhesive composition for LED packaging is at 175° C. for 15 min. The cured conductive adhesive was put into ethylenediamine solvent of 8 times by weight and heated at 60° C. for 2 h, so that the epoxy resin component was completely degraded. The obtained mixture was filtered and separated to obtain a filter cake. The filter cake was washed with absolute ethanol for 3 times and then dried in vacuum to obtain the recyclable conductive silver powder. The performance of the recyclable conductive adhesive composition for LED packaging prepared in this embodiment is shown in Table 1.

Example 2

The following components were accurately weighed and put into a blender using the revolution and rotation synchronous agitation mode to mix for 3 min: 9 parts of electronic grade bisphenol F epoxy resin (Huayi, Shanghai), 3 parts of naphthol bifunctional epoxy resin (DIC Corporation, Japan), 3.1 parts of diluent glycol diglycidyl ether, 5 parts of curing agent containing imine bond, 1 parts of 1-methyl-2,4-cyclohexanediamine, 0.3 parts of 1-cyanoethyl-2 ethyl-4-methylimidazole, 0.2 parts of wetting dispersant VATIX 2018 (Vatix, Beijing), 0.2 parts of coupling agent Silok 6634E (Silok, Guangzhou), 0.2 parts of defoamer BYK-320 (BYK, Germany). Then 78 parts of sheet silver powders with an average diameter of 8 μm (Northwest Institute for Non-ferrous Metal Research) were added to the above obtained liquid mixture and put into a blender using the revolution and rotation synchronous agitation mode to disperse for 3 min. The obtained mixture was defoamed for 60 min in vacuum to obtain the recyclable conductive adhesive for LED packaging. The structural formula of the curing agent containing imine bond is as follows:

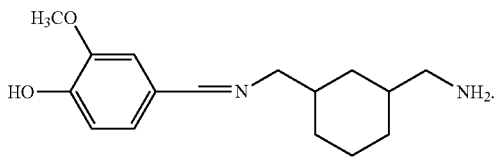 [SMILES: COc1cc(C=NCC2CCCC(CN)C2)ccc1O]

The curing condition of the recyclable conductive adhesive composition for LED packaging is at 170° C. for 20 min. The cured conductive adhesive was put into butylamine solvent of 5 times by weight and heated at 50° C. for 4 h, so that the epoxy resin component was completely degraded. The obtained mixture was filtered and separated to obtain a filter cake. The filter cake was washed with absolute ethanol for 3 times and then dried in vacuum to obtain the recyclable conductive silver powder. The performance of the recyclable conductive adhesive composition for LED packaging prepared in this embodiment is shown in Table 1.

Example 3

The following components were accurately weighed and put into a blender using the revolution and rotation synchronous agitation mode to mix for 2 min: 4 parts of electronic grade bisphenol A epoxy resin (Huayi, Shanghai), 5 parts of electronic grade bisphenol F epoxy resin (Huayi, Shanghai), 2 parts of naphthol bifunctional epoxy resin (DIC Corporation, Japan), 2.2 parts of diluent neopentyl glycol diglycidyl ether, 4 parts of curing agent containing imine bond, 2 parts of 1,3-bis(aminomethyl) cyclohexane, 0.2 parts of DMP-30, 0.2 parts of wetting dispersant BYK-W980 (BYK, Germany), 0.2 parts of coupling agent SCA-E87M (NANJING CAPATUE CHEMICAL CO., LTD), and 0.2 parts of defoamer BYK-A530 (BYK, Germany). Then 80 parts of sheet silver powders with an average diameter of 10 μm (Northwest Institute for Non-ferrous Metal Research) were added to the above obtained liquid mixture and put into a blender using the revolution and rotation synchronous agitation mode to disperse for 2 min. The obtained mixture was defoamed for 60 min in vacuum to obtain the recyclable conductive adhesive for LED packaging. The structural formula of the curing agent containing imine bond is as follows:

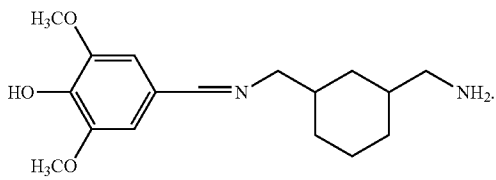 [SMILES: COc1cc(C=NCC2CCCC(CN)C2)cc(OC)c1O]

The curing condition of the recyclable conductive adhesive composition for LED packaging is at 190° C. for 20 min. The cured conductive adhesive was put into isophorone diamine solvent of 10 times by weight and heated at 80° C. for 6 h, so that the epoxy resin component was completely degraded. The obtained mixture was filtered and separated to obtain a filter cake. The filter cake was washed with absolute ethanol for 3 times and then dried in vacuum to obtain the recyclable conductive silver powder. The performance of the recyclable conductive adhesive composition for LED packaging prepared in this embodiment is shown in Table 1.

Comparative Example 1

The following components were accurately weighed and put into a blender using the revolution and rotation synchronous agitation mode to mix for 2 min: 8 parts of electronic grade bisphenol A epoxy resin (Huayi, Shanghai), 2 parts of naphthol bifunctional epoxy resin (DIC Corporation, Japan), 3 parts of diluent neopentyl glycol diglycidyl ether, 2 parts of 1-methyl-2,4-cyclohexanediamine, 0.2 parts of wetting dispersant BYK-W980 (BYK, Germany), 0.2 parts of coupling agent A-187 (Momentive, USA), and 0.2 defoamer BYK-A530 (BYK, Germany). Then 82 parts of sheet silver powders with an average diameter of 12 μm (Northwest Institute for Non-ferrous Metal Research) were added to the above obtained liquid mixture and put into a blender using the revolution and rotation synchronous agitation mode to disperse for 2 min. The obtained mixture was defoamed for 60 min in vacuum to obtain the recyclable conductive adhesive for LED packaging.

The curing condition of the recyclable conductive adhesive composition for LED packaging is at 170° C. for 15 min. The cured conductive adhesive was put into ethylenediamine solvent of 10 times by weight and heated at 80° C. for 6 h. The performance of the conductive adhesive composition for LED packaging prepared in this embodiment is shown in Table 1.

Test

Experimental Test 1: Viscosity Test

The viscosities of the samples obtained from the above embodiments was measured at room temperature by a cone plate rotary viscometer.

Experimental Test 2: Volume Resistivity Test

The volume resistivities of the samples obtained from the above embodiments were measured by the four probe method based on the test standard of ASTM D257-2007.

Experimental Test 4: Shear Strength Test

The shear strengths of the samples obtained from the above embodiments were measured by a universal mechanical testing machine based on the test standard of ASTM D1002.

The experimental test results of the above embodiment are shown in Table 1.

TABLE 1

Test results of Examples and Comparative Example

|  | Viscosity (mPa · s) | Volume resistivity ($10^{-4}$ Ω · cm) | Shear strength (MPa) | Degradation temperature (° C.) | Degradation time (h) |
| --- | --- | --- | --- | --- | --- |
| Example 1 | 12480 | 2.4 | 7.2 | 60 | 2 |
| Example 2 | 9860 | 40.6 | 9.5 | 40 | 4 |
| Example 3 | 11640 | 9.8 | 7.9 | 80 | 6 |
| Comparative example 1 | 12050 | 2.8 | 6.8 | No degradation | No degradation |

The above description is only the preferred embodiments of the present invention and is not intended to limit the present invention. Any modification, equivalent replacement and the like within the spirit and principle of the present invention shall be included in the protection scope of the present invention.

What is claimed is:

1. A recyclable conductive adhesive composition for LED packaging, characterized in comprising the following components by weight:
   epoxy resin, 8% to 12%;
   epoxy resin diluent, 2% to 4%;
   curing agent containing imine bond, 3% to 6%;
   amine curing agent, 1% to 3%;
   curing accelerator, 0.1% to 0.3%;
   wetting dispersant, 0.1% to 0.3%;
   coupling agent, 0.1% to 0.3%;
   defoamer, 0.1% to 0.3%;
   conductive silver powder, 78% to 82%;
   wherein, the epoxy resin comprises at least two selected from electronic grade bisphenol A epoxy resin, electronic grade bisphenol F epoxy resin and naphthol bifunctional epoxy resin;
   the structural formula of the curing agent containing imine bond is

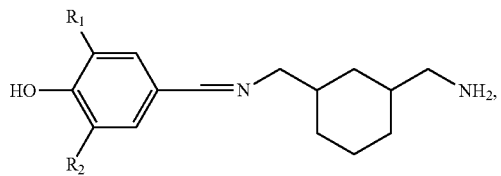

wherein $R_1$ is hydrogen or methoxy, $R_2$ is hydrogen or methoxy;
   the amine curing agent is polyether amine curing agent and/or alicyclic amine curing agent; and
   wherein the conductive silver powder has an average diameter in the range of from 5 μm to 20 μm.

2. The recyclable conductive adhesive composition for LED packaging of claim 1, characterized in that, the epoxy resin diluent is one selected from ethylene glycol diglycidyl ether, butanediol diglycidyl ether and neopentyl glycol diglycidyl ether.

3. The recyclable conductive adhesive composition for LED packaging of claim 1, characterized in that, the alicyclic amine curing agent is at least one selected from isophorone diamine, 1,3-bis(aminomethyl)cyclohexane, 1-methyl-2,4-cyclohexanediamine and 4,4'-diaminodicyclohexylmethane.

4. The recyclable conductive adhesive composition for LED packaging of claim 1, characterized in that, the curing accelerator is one selected from 2-ethyl-4-methylimidazole, 1-benzyl-2-methylimidazole and 1-cyanoethyl-2-ethyl-4-methylimidazole.

5. The recyclable conductive adhesive composition for LED packaging of claim 1, characterized in that, the average diameter of the conductive silver powder is 10 μm to 15 μm.

6. A preparation method of the recyclable conductive adhesive composition for LED packaging of claim 1, characterized in comprising the following steps:
   (1) weighing each component by its weight percentage;
   (2) putting epoxy resin, epoxy resin diluent, curing agent containing imine bond, amine curing agent, curing accelerator, wetting dispersant, coupling agent and defoamer into a blender to disperse to obtain a liquid mixture;
   (3) adding conductive silver powder into the liquid mixture, dispersing in a blender, and then defoaming to obtain the recyclable conductive adhesive composition for LED packaging.

7. The preparation method of claim 6, characterized in that, in step (2), the dispersing lasts for 2 min to 4 min.

8. The preparation method of claim 6, characterized in that, in step (2) and/or step (3), the blender is in a mode of revolution and rotation synchronous agitation.

9. The preparation method of claim 6, characterized in that, in step (3), the dispersing lasts for 2 min to 4 min.

10. The preparation method of claim 6, characterized in that, in step (3), the defoaming is in vacuum and lasts for 30 min to 60 min.

11. A method for producing a conductive silver powder, characterized in comprising the following steps:
   (1) putting a cured recyclable conductive adhesive composition obtained by curing the recyclable conductive adhesive composition of claim 1, into an amine solvent, heating it to obtain a mixture;
   (2) filtering and separating the mixture obtained in step (1) to obtain a filter cake; and
   (3) washing and drying the filter cake to obtain a conductive silver powder.

12. The method of claim 11, characterized in that, in step (1), the amine solvent is 5 to 10 times the weight of the cured recyclable conductive adhesive composition.

13. The method of claim 11, characterized in that, in step (1), the amine solvent includes at least one selected from butylamine, hexylamine, ethylenediamine, isophorone diamine, 1,3-bis(aminomethyl) cyclohexane, 1-methyl-2,4-cyclohexanediamine and 4,4'-diamino dicyclohexylmethane.

14. The method of claim 11, characterized in that, in step (1), the heating is at the temperature of 50° C. to 80° C. and lasts for 2 h to 4 h.

15. The method of claim 11, characterized in that, in step (3), the filer cake is washed with absolute ethanol and drying it in vacuum.

* * * * *